United States Patent [19]

Benois

[11] 4,103,507

[45] Aug. 1, 1978

[54] HIGH SPEED FREEZING SYSTEM

[75] Inventor: Hugues G. Benois, Reinach, Switzerland

[73] Assignee: Airco, Inc., Montvale, N.J.

[21] Appl. No.: 807,621

[22] Filed: Jun. 17, 1977

Related U.S. Application Data

[63] Continuation of Ser. No. 594,928, Jul. 10, 1975, abandoned.

[51] Int. Cl.² ............................................. F25D 13/02
[52] U.S. Cl. ........................................ 62/63; 62/225; 62/266; 62/381
[58] Field of Search ............... 62/51, 63, 203, 208, 62/381, 266, 225; 239/559, 569

[56] References Cited

U.S. PATENT DOCUMENTS

| | | | |
|---|---|---|---|
| 2,140,744 | 12/1938 | Hirsch | 62/381 |
| 3,027,355 | 3/1962 | Taul et al. | 239/569 |
| 3,298,188 | 1/1967 | Webster et al. | 62/63 |
| 3,412,573 | 11/1968 | Pauliukonis | 62/381 |
| 3,845,635 | 5/1974 | Perkins et al. | 62/51 |
| 3,866,432 | 2/1975 | Harrison | 62/381 |

Primary Examiner—Ronald C. Capossela
Attorney, Agent, or Firm—Roger M. Rathbun; Edmund W. Bopp; H. Hume Mathews

[57] ABSTRACT

A fast-freeze system comprises an insulating housing for a product conveyor of the vertical helix or spiral-type wherein the upper and lower loops (or tiers) respectively, of the helix discharge or receive the product, as the case may be, at product openings (or ports) in the housing; a multiple-spray nozzle array on a header receives a regulated supply of liquid nitrogen according to a preset freezing temperature through a modulating servo-valve control; the header subtends a restricted sector only of an upper conveyor tier for producing heat transfer by direct liquid nitrogen-to-product contact to establish a single very cold zone substantially in advance of the discharge port, and the exhaust nitrogen vapor is discharged by blower action through the product entrance port.

6 Claims, 2 Drawing Figures

HIGH SPEED FREEZING SYSTEM

This is a continuation of application Ser. No. 594,928, filed July 10, 1975, now abandoned.

BACKGROUND OF INVENTION

Fast-freeze systems for processing food products, such as meats, fruits, vegetables, etc. have been extensively used in the food industry for many years in order to preserve and store for economical year-round use seasonal foods and those whose production is subject to variables of economic conditions. In addition to storage, an important commercial consideration requires that the natural flavor, juices, nutrients, color and appearance of the foods be preserved to the extent practically possible. In this respect, high rate of freezing is an important consideration.

The prior art systems generally available for this purpose have significant disadvantages that the present invention aims to overcome; for example, in the well-known cold air-blast system, the freezing process is not sufficiently fast for avoiding some dehydration, with corresponding decrease in quality of the frozen product. Spraying of liquid carbon dioxide into the freezing compartment where it is vaporized and circulated around the food products, has also been used and found in some instances to lack sufficiently high freezing rate for desired production. In another known system wherein freezing takes place within a so-called liquid-nitrogen tunnel, the operation is generally more expensive due to the cost of the storage and transfer piping required to handle it; also, production time may be lost while waiting for cool-down of the tunnel. Other freezing systems using nitrogen in lieu of carbon dioxide spray have been tried but have not to the best of applicant's knowledge been successful for obtaining satisfactory freezing due in general to improper techniques in handling the nitrogen spray.

The present invention is concerned with a highly efficient and high-speed freezing system that utilizes liquid nitrogen spray to advantage, and is economical both in equipment cost, operating cost and system maintenance.

SUMMARY OF INVENTION

In accordance with the invention, high speed and efficient food freezing is economically achieved in a new and improved system wherein the principal features of several component systems, namely (1) a freezing compartment with a spiral-type conveyor system having multiple tiers, as in a vertical helix, (2) a liquid nitrogen (LQN) supply with a feed system regulated by a temperature sensor located appropriately in the freezing compartment, and (3) a multiple spray array and header connected to the LQN feed system, are advantageously combined within an insulating housing or freezing compartment in unique manner for efficient high-speed freezing.

In particular, the header which is formed as a loop or equivalent, has a multiple array of spray jets that subtend and impinge upon an arcuate sector of a single tier of the conveyor to produce a single very cold zone, preferably at the upper tier of the conveyor and significantly in advance of the product discharge port. In this arrangement, LQN spray not falling directly on the product itself, continues falling through the usual mesh-type conveyor belt onto the product in the next lower tier, thereby completely and efficiently utilizing the heat of vaporization factor for rapid heat transfer and progressive cooling of the product; in addition, the now vaporized cold nitrogen gas ($N_2$) further chills the oncoming product on the lower tiers as the $N_2$ is moved downward through the conveyor by conventional fan or blower action. The $N_2$ under blower pressure finally exhausts through the product entrance port, thereby efficiently serving to pre-cool the entering product.

A principal object of the invention therefore is to provide a new and improved freezing system and process using liquid nitrogen spray for freezing food products, that has exceptionally fast freezing capability for obtaining improved quality of the frozen product, and that is efficient and economical as regards production time, operation and maintenance.

Other objects, features and advantages will appear from the following description with reference to the accompanying drawings.

DESCRIPTION OF PREFERRED EMBODIMENT

Figure 1:
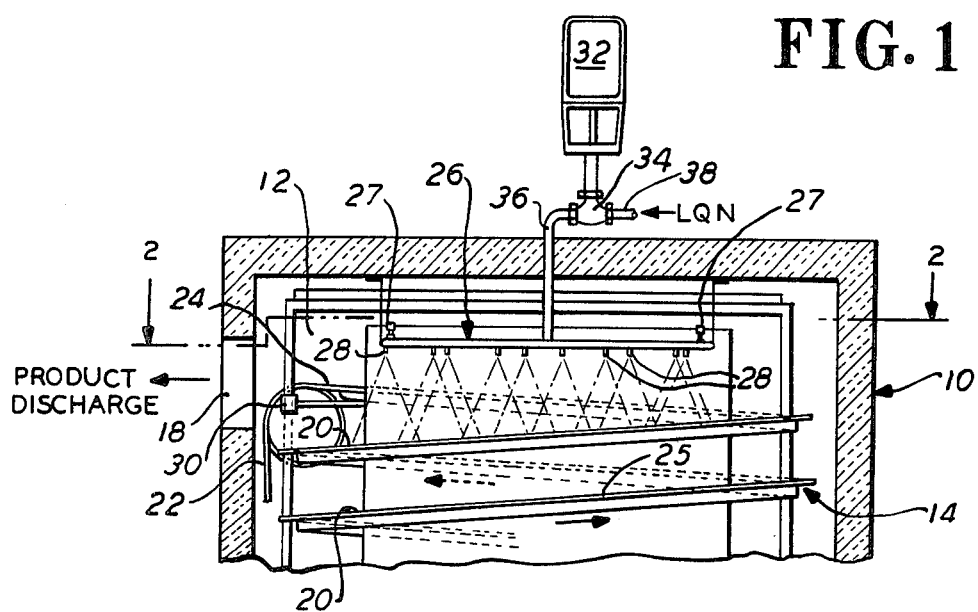
FIG. 1 is a partial elevational view in section of food freezing apparatus of the spiral conveyor type embodying the present invention.
Figure 2:
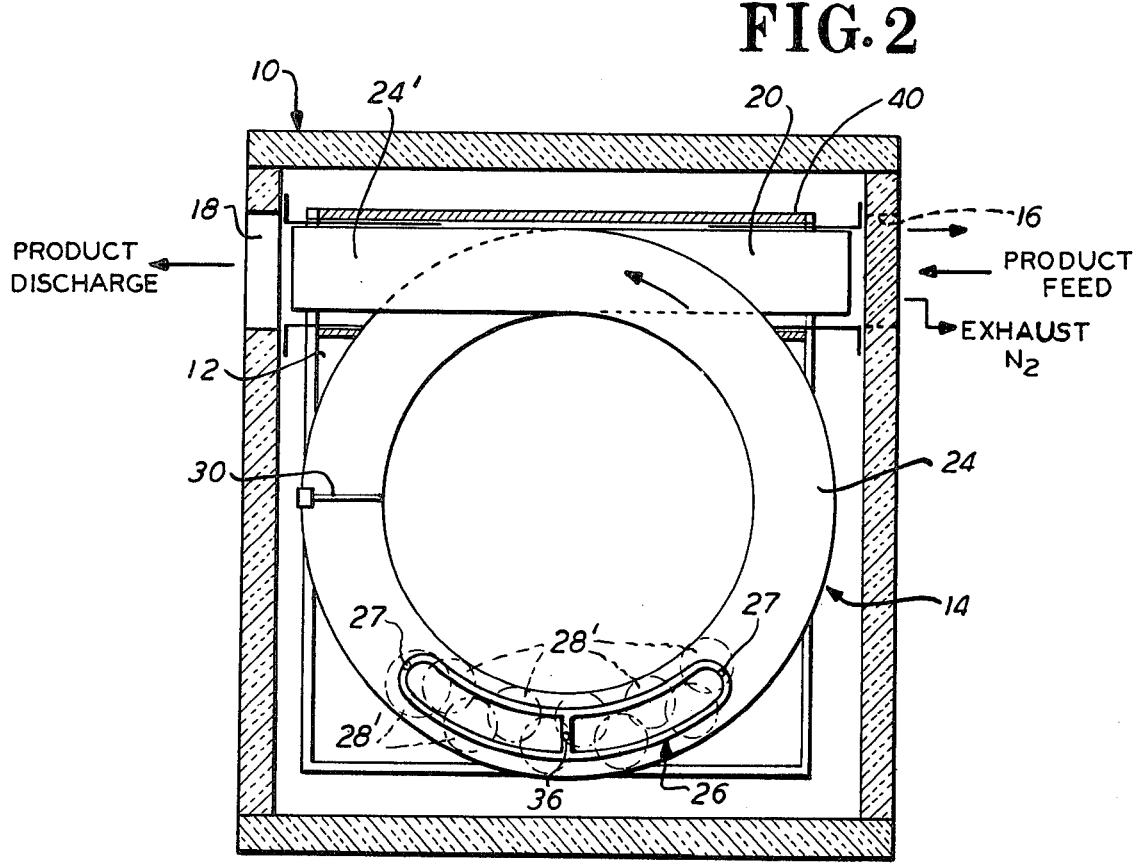
FIG. 2 is a plan view of the apparatus taken along the section line 2—2 of FIG. 1.

FIG. 1 shows the upper part of the freezing compartment and apparatus that contains essentially the basic components of the invention, the lower remainder of the housing and apparatus being apparent from the section view, FIG. 2. The basic components comprise an insulating housing 10 forming a freezing compartment 12 within which is mounted a food transport or conveyor equipment generally indicated at 14. The insulating housing with suitable access doors, etc. and the conveyor can in general be of the construction disclosed in U.S. Pat. No. 3,733,848, granted to Duron et al, May 22, 1973 for "FREEZING SYSTEM". In the preferred form of the invention lower section of the compartment housing (not shown) has a product entrance opening or port 16 opposite a conveyor tier (as indicated in FIG. 2) and the upper section shown in FIG. 1 has a product discharge opening or port 18 at the opposite side of the compartment through which the product from the corresponding conveyor tier passes.

The conveyor is preferably of the spiral type in the configuration of a vertical helix. As indicated in FIG. 1, a plurality of ascending flights or tiers 20 are formed by a continuous belt 22 that carries the product to be frozen upwardly along the spiral from the entrance port 16 to the discharge port 18. The conveyor belt 22, which may advantageously be of stainless steel mesh, is mounted, driven and guided within the housing 10 in any suitable manner, such as disclosed for example in U.S. Pat. No. 3,733,848 above. In the preferred embodiment shown, the entrance port 16 opens onto the ramp of the lowest tier of the conveyor, FIG. 2, and the upper tier 24 discharges at its ramp 24' the product through the port 18.

Freezing of the product is accomplished by LQN spray that is directed by a multiple spray-nozzle array on a header 26 from above directly onto the product moving along the upper tier 24 as indicated in FIG. 1. The header which in the present example defines a double loop, FIG. 2, has a comparatively large number of jet spray nozzles 28 that are compactly arranged for insuring that the respective spray patterns combine to cover and to concentrate a comparatively large amount of LQN spray per unit area on the tier belt beneath the header.

A vent nozzle 27 functioning as a gas relief valve is mounted on the upper side of the header at each end thereof to prevent accumulation of $N_2$ vapor in the header due to heat inleak. This provides for (1) equalization of pressure at the respective spray nozzles, (2) liquid phase flow only of LQN through the nozzles for true liquid-to-product heat transfer, and (3) efficient and uniform utilization of excess LQN for the product on the next following tier below.

As shown, the spray header 26 covers but a minor portion only of the upper tier 24, so that the area-concentrated LQN spray produces a single very cold zone solely at that portion. In the example disclosed, the header subtends approximately a 90° sector of the tier 24, this sector being located about 180° (or ½ revolution) in advance of the discharge port 18. This provides for practical temperature equalization before product discharge. The cold zone is remotely located from lubricated bearings, etc. of the spiral conveyor system that may be adversely affected by very low temperatures. The direct LQN-to-product contact provides for optimum temperature differential and heat transfer coefficient.

The regulation of the LQN spray is advantageously in response to a signal from a temperature sensor 30 that is positioned at an appropriate place in the freezing compartment, for example, about 45° in advance, i.e. upstream with reference to the product flow, of the cold sector with the probe preferably above the upper tier belt as indicated in FIG. 1. The temperature signal, which is with reference to a preset temperature value, is used for electronic control in known manner of an electric servo-motor 32 that operates a modulating valve 34 according to the magnitude and sense of the signal. The valve 34, which controls the LQN supply line 36 between a suitable LQN source at 38 and the loop header 26, regulates the amount of LQN spray delivered (according to the temperature setting) to the cold sector described above.

It will be apparent that some of the concentrated LQN spray will fall directly onto the mesh tier belt beneath the compact loop header 26 rather than onto the product; in this case the LQN spray, which tends to flood the limited area beneath the header, will fall through the belt onto the product on the next lower tier or tiers, thereby completing optimum heat transfer by LQN-to-product contact. Accordingly, only the sensible heat of $N_2$ vapor is being transferred to the product in the remaining lower tiers of the freezer by means of the usual circulating fans or blowers. This insures temperatures that are compatible with the spiral conveyor equipment, especially at the lower part of the housing containing the mechanical drive gear, etc.

The exhaust $N_2$ under blower pressure is discharged only through the product entrance port 16 as mentioned above, thereby precooling the incoming product and reducing the so-called "residence" temperature. In practice, the $N_2$ is discharged at about 0° F. This comparatively high temperature clearly indicates that a high degree of refrigeration is obtained from the LQN and $N_2$ phases, that in turn results in reduced consumption of LQN.

For facilitating $N_2$ exhaust solely through the entrance port 16, FIG. 2, and producing progressive cooling of the product from the moment it enters the freezing compartment, the exhaust $N_2$ vapors are directed in counterflow to the incoming product flow by means of an exhaust fan (not shown) through a stainless steel sheet metal channel 40 that envelopes the comparatively straight section of the conveyor belt ramp leading from the port 16.

In summary, the present invention is found to be an improved and highly efficient fast freezing system that combines the inherent advantages of the spiral type product conveyor with an intense and direct application of LQN spray to the product within a limited sector only of a single upper tier. This LQN spray application materially in advance of the product discharge, produces the single and only intense cold zone in the freezing compartment. The use of any excess LQN spray for directly cooling the product on the next following tier or tiers, together with the efficient use of the sensible heat in the remaining $N_2$ vapor before exhaust from the freezing compartment significantly increases the efficiency of the refrigeration process thereby utilizing to an optimum extent the LQN supply. High efficiency is further insured by the use of a proportional flow valve control of modulated type that is responsive to a predetermined temperature sensor signal.

Having set forth the invention in what is considered to be the best embodiment thereof, it will be understood that changes may be made in the system and apparatus as above set forth without departing from the spirit of the invention or exceeding the scope thereof as defined in the following claims. For example, the LQN spray header is not necessarily located above the top conveyor tier, and may in fact be located above a lower tier where efficient LQN-to-product heat transfer is achieved.

What is claimed is:

1. A high-rate freezing system of the kind having an insulating housing forming a freezing compartment with an entrance port and a discharge port for the product to be frozen, and a product conveyor of the porous belt vertical helix type within the compartment with the lower and upper terminal tiers thereof located opposite the entrance and discharge ports respectively, the freezing system comprising:

(a) a header having a multiplicity of spray nozzles grouped in compact array and disposed in an arc along and above the upper tier leading to the discharge port, the arcuate array spanning a partial circumferential section of the upper tier and the nozzle spray patterns of the array merging throughout the length of the spanned section, thereby covering the tier area spanned, (b) a source of liquid nitrogen connected through a control valve to the header and spray nozzles, (c) flow control means for adjusting the control valve according to a pre-set compartment freezing temperature to cause the liquid nitrogen spray to be concentrated on and to flood the spanned section area, thereby establishing on the upper tier a single high-rate heat transfer zone in advance of the discharge port, and (d) guiding means at the lower tier for causing used nitrogen vapor drawn by induction through the entrance port to flow over and pre-cool the entering product.

2. A freezing system as specified in claim 1 wherein the nozzle array spans the tier section throughout an arc of less than 180°.

3. A freezing system as specified in claim 2 wherein approximately 90° of the upper tier section is spanned by the arcuate nozzle array, and the array is located approximately 180° upstream of the discharge port.

4. A freezing system as specified in claim 2 wherein the arcuate array of nozzles is in the form of an elongated compressed loop and the respective nozzles are compactly positioned around the loop to cause the respective spray patterns to merge throughout the spanned tier section, the loop having a cross-connection at its mid-point connected to the liquid nitrogen supply.

5. A freezing system as specified in claim 2 wherein the flow control means include a servo-motor that is continuously responsive to signals from a temperature sensor located approximately 45° upstream of the arcuate array along the upper tier.

6. A freezing system as specified in claim 1 wherein the product receiving lower tier of the conveyor is movable within a gas guiding channel that is substantially continuous with the entrance port, and the induction means at the entrance port causes exhaust of used nitrogen gas through the channel and exhaust port.

* * * * *

UNITED STATES PATENT AND TRADEMARK OFFICE
CERTIFICATE OF CORRECTION

PATENT NO. : 4,103,507
DATED : August 1, 1978
INVENTOR(S) : HUGUES G. BENOIS

It is certified that error appears in the above-identified patent and that said Letters Patent are hereby corrected as shown below:

Col. 6, line 11, "exhaust" should read -- entrance --.

Signed and Sealed this

Tenth Day of April 1979

[SEAL]

Attest:

RUTH C. MASON
Attesting Officer

DONALD W. BANNER
Commissioner of Patents and Trademarks